(12) United States Patent
Nagar et al.

(10) Patent No.: US 9,957,901 B2
(45) Date of Patent: May 1, 2018

(54) FUEL LIMITER FOR A UNIFLOW-SCAVENGED, TWO-STROKE CYCLE, OPPOSED-PISTON ENGINE

(71) Applicant: ACHATES POWER, INC., San Diego, CA (US)

(72) Inventors: Nishit Nagar, San Diego, CA (US); Arunandan Sharma, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 101 days.

(21) Appl. No.: 15/062,868

(22) Filed: Mar. 7, 2016

(65) Prior Publication Data

US 2017/0204790 A1    Jul. 20, 2017

Related U.S. Application Data

(60) Provisional application No. 62/279,301, filed on Jan. 15, 2016.

(51) Int. Cl.
| | |
|---|---|
| *F02B 75/28* | (2006.01) |
| *F02D 1/06* | (2006.01) |
| *F02B 25/08* | (2006.01) |
| *F02B 75/02* | (2006.01) |
| *F02M 63/02* | (2006.01) |

(52) U.S. Cl.
CPC ............... *F02D 1/06* (2013.01); *F02B 25/08* (2013.01); *F02B 75/02* (2013.01); *F02M 63/0225* (2013.01); *F02B 2075/025* (2013.01)

(58) Field of Classification Search
CPC ........ F02B 25/08; F02B 25/28; F02B 25/287; F02B 25/32; F02B 25/38; F02B 75/02; F02B 2075/025; F02D 1/06; F02M 63/0225; F02M 25/08; F02M 59/20
USPC ..... 123/51 BA, 51 B, 53.3, 53.4, 55.2, 55.6, 123/55.7, 73 C
See application file for complete search history.

(56) References Cited

U.S. PATENT DOCUMENTS

| | | | |
|---|---|---|---|
| 3,015,934 A | 1/1962 | Miller | 60/601 |
| 4,601,270 A | 7/1986 | Kimberley et al. | 123/357 |
| 4,719,893 A | 1/1988 | Buslepp et al. | 123/571 |
| 5,155,998 A | 10/1992 | Monden | 60/602 |
| 6,092,504 A | 7/2000 | Barnes et al. | 123/357 |

(Continued)

FOREIGN PATENT DOCUMENTS

| | | |
|---|---|---|
| DE | 10 2015 120741 A1 | 6/2016 |
| JP | H100238383 A | 9/1998 |
| WO | WO-2015/026628 A1 | 2/2015 |

OTHER PUBLICATIONS

International Search Report dated Mar. 30, 2017 for PCT application No. PCT/US2017/012570.

(Continued)

*Primary Examiner* — Hai Huynh
*Assistant Examiner* — Gonzalo Laguarda
(74) *Attorney, Agent, or Firm* — Terrance A. Meador; Julie J. Muyco

(57) ABSTRACT

Control of fuel flow in a uniflow-scavenged, two-stroke cycle, opposed-piston engine includes limiting an amount of torque or fuel in response to a torque demand, based upon a comparison and a selection of fuel delivery options derived from a global airflow parameter and/or a trapped airflow parameter.

2 Claims, 7 Drawing Sheets

(56) References Cited

U.S. PATENT DOCUMENTS

| | | | | |
|---|---|---|---|---|
| 6,152,107 | A | 11/2000 | Barnes et al. | 123/357 |
| 6,182,449 | B1 | 2/2001 | Halimi et al. | 60/612 |
| 6,725,134 | B2 | 4/2004 | Dilien et al. | 701/19 |
| 6,968,830 | B2 | 11/2005 | Glenn et al. | 123/501 |
| 6,990,951 | B1 | 1/2006 | Liu et al. | 123/299 |
| 7,000,590 | B2 | 2/2006 | Carlton et al. | 123/357 |
| 7,063,076 | B1 * | 6/2006 | Sun | F02D 41/0055 |
| | | | | 123/478 |
| 7,182,075 | B2 | 2/2007 | Shahed et al. | 123/568.21 |
| 7,320,219 | B2 | 1/2008 | Sun | 60/605.2 |
| 8,011,349 | B2 | 9/2011 | Felton | 123/436 |
| 8,307,645 | B2 | 11/2012 | Mischler et al. | 60/605.1 |
| 8,627,805 | B2 | 1/2014 | Perr et al. | 123/568.12 |
| 8,904,787 | B2 | 12/2014 | Styles et al. | 60/605.2 |
| 8,997,457 | B2 | 4/2015 | Leone et al. | 13/219 |
| 9,062,577 | B2 | 6/2015 | Koci et al. | F01N 3/035 |
| 9,109,546 | B2 | 8/2015 | Andreae et al. | 25/728 |
| 9,206,751 | B2 | 12/2015 | Herold et al. | F02D 41/0007 |
| 9,222,426 | B2 | 12/2015 | Rollinger et al. | F02D 41/0002 |
| 9,228,512 | B2 | 1/2016 | Chen et al. | F02D 41/0077 |
| 9,284,884 | B2 | 3/2016 | Nagar et al. | 123/568.14 |
| 2004/0181332 | A1 | 9/2004 | Birkner et al. | 701/104 |
| 2005/0145222 | A1 | 7/2005 | Glenn et al. | 123/501 |
| 2006/0117750 | A1 | 6/2006 | Shaped et al. | 60/602 |
| 2006/0137660 | A1 | 6/2006 | Shirakawa | 123/493 |
| 2007/0089715 | A1 | 4/2007 | Kolavennu | 123/568.11 |
| 2007/0209362 | A1 | 9/2007 | Sun | 60/602 |
| 2010/0005784 | A1 | 1/2010 | Bird et al. | 60/284 |
| 2011/0067680 | A1 | 3/2011 | Williams et al. | 123/568.21 |
| 2011/0225967 | A1 | 9/2011 | Karnik et al. | 60/602 |
| 2011/0289916 | A1 | 12/2011 | Dion et al. | 60/605.2 |
| 2011/0320105 | A1 | 12/2011 | Takagawa et al. | 701/103 |
| 2012/0209496 | A1 | 8/2012 | Miyashita | 701/102 |
| 2012/0312283 | A1 | 12/2012 | Nam | 123/568.11 |
| 2012/0330534 | A1 | 12/2012 | Cleeves et al. | 701/104 |
| 2013/0104848 | A1 | 5/2013 | Klyza et al. | 123/445 |
| 2013/0289849 | A1 | 10/2013 | Uehara et al. | 701/103 |
| 2013/0304357 | A1 | 11/2013 | Koci et al. | 701/108 |
| 2014/0026563 | A1 | 1/2014 | Dion et al. | F02M 25/0747 |
| 2014/0102092 | A1 | 4/2014 | Karnik et al. | 60/602 |
| 2014/0299104 | A1 | 10/2014 | Quechon et al. | 123/478 |
| 2014/0331963 | A1 | 11/2014 | Grant et al. | 123/304 |
| 2014/0373814 | A1 * | 12/2014 | Herold | F02D 41/0007 |
| | | | | 123/51 B |
| 2014/0373815 | A1 | 12/2014 | Nagar et al. | 123/51 B |
| 2014/0373816 | A1 * | 12/2014 | Nagar | F02D 41/0007 |
| | | | | 123/51 B |
| 2015/0032308 | A1 | 1/2015 | Whitney et al. | 701/22 |
| 2015/0033736 | A1 * | 2/2015 | Kalebjian | F02B 29/0412 |
| | | | | 60/605.2 |
| 2015/0047322 | A1 | 2/2015 | Peters | 123/568.12 |
| 2016/0237928 | A1 | 8/2016 | Lana | 60/605.2 |

OTHER PUBLICATIONS

International Search Report dated Mar. 29, 2017 for PCT application No. PCT/US2017/012592.

Notice of Allowance dated Jan. 10, 2018, for U.S. Appl. No. 15/370,673.

International Search Report and Written Opinion dated Feb. 13, 2018, for PCT application No. PCT/US2017/060564.

* cited by examiner

| RPM | Desired Load | | | | | | | | | |
|---|---|---|---|---|---|---|---|---|---|---|
| | 10% | 20% | 30% | 40% | 50% | 60% | 70% | 80% | 90% | 100% |
| $RPM_1$ | AFR | AFR | AFR | AFR | AFR | AFR | AFR | AFR | AFR | AFR |
| $RPM_2$ | AFR | AFR | AFR | AFR | AFR | AFR | AFR | AFR | AFR | AFR |
| $RPM_3$ | AFR | AFR | AFR | AFR | AFR | AFR | AFR | AFR | AFR | AFR |
| ... | ... | ... | ... | ... | ... | ... | ... | ... | ... | ... |
| $RPM_j$ | AFR | AFR | AFR | AFR | AFR | AFR | AFR | AFR | AFR | AFR |
| ... | ... | ... | ... | ... | ... | ... | ... | ... | ... | ... |

FIG. 7

FUEL LIMITER FOR A UNIFLOW-SCAVENGED, TWO-STROKE CYCLE, OPPOSED-PISTON ENGINE

PRIORITY

This application claims priority to U.S. Provisional Application Ser. No. 62/279,301 filed in the United States Patent and Trademark Office on 15 Jan. 2016.

RELATED APPLICATIONS

This application contains subject matter related to the subject matter of the following US applications, which are commonly owned herewith: U.S. patent application Ser. No. 13/654,340, filed Oct. 17, 2012, published as US 2013/0104848 A1; U.S. patent application Ser. No. 13/926,360 filed on Jun. 25, 2013, published as US 2014/0373814 A1, and issued as U.S. Pat. No. 9,206,751 B2 on Dec. 8, 2015; U.S. patent application Ser. No. 14/039,856, filed on Sep. 27, 2013, published as US 2014/0026563 A1; and U.S. patent application Ser. No. 14/378,252, filed on Aug. 12, 2014, published as US 2015/0033736 A1.

FIELD

The field is control and operation of air handling systems and fuel handling systems for two-stroke cycle, opposed-piston engines. In particular, the field covers limitation of a fuel quantity or a torque quantity in uniflow-scavenged, two-stroke cycle, opposed-piston engines in response to demands for increased torque.

BACKGROUND

A two-stroke cycle engine is an internal combustion engine that completes a cycle of operation with a single complete rotation of a crankshaft and two strokes of a piston connected to the crankshaft. The strokes are typically denoted as compression and power strokes. In a two-stroke cycle, opposed-piston ("OP2S") engine two pistons are disposed crown-to-crown in the bore of a cylinder for reciprocating movement in opposing directions. The cylinder has longitudinally-spaced inlet and exhaust ports formed in the cylinder sidewall near respective ends of the cylinder. Each of the opposed pistons controls a respective one of the ports, opening the port as it moves toward a bottom dead center (BDC) location during a power stroke (also called an expansion stroke), and closing the port as it moves from BDC toward a top dead center (TDC) location during a compression stroke. One of the ports provides passage for the products of combustion out of the bore, the other serves to admit pressurized air into the bore; these are respectively termed the "exhaust" and "intake" ports.

OP2S engines typically operate according to the compression-ignition principle. During a compression stroke, turbulent pressurized air ("charge air") enters the bore of a cylinder through the intake port and is compressed between the end surfaces of the two pistons as they move from BDC toward TDC. Fuel injected between the approaching piston end surfaces mixes with the turbulent air. Near TDC of the pistons, the air/fuel mixture is ignited by the heat of the compressed air, and combustion follows.

In a uniflow-scavenged OP2S engine, near the end of a power stroke, charge air entering a cylinder through the intake port displaces exhaust gas flowing out of the cylinder through the exhaust port. Thus gas flows through the cylinder in one direction ("uniflow")—from intake port to exhaust port. A continuous positive pressure differential must exist from the intake ports to the exhaust ports of the engine in order to maintain the desired unidirectional flow of gas in the cylinders. In many cases, this need is met by an engine air handling system that includes a fast acting, positive-displacement pump, upstream from the engine's intake ports. This role is typically filled by a supercharger (or blower) which is driven mechanically by an engine crankshaft, by direct connection, as with a belt or a chain. The air handling system may include a turbocharger, powered by exhaust energy, and including a compressor that is placed ahead (upstream) of the supercharger in order to increase the density of intake air fed into the supercharger. Depending on design requirements, a uniflow-scavenged, OP2S engine may include either or both of a mechanically-driven supercharger and an exhaust-driven turbocharger.

Operation of an OP2S engine subjects it to demands for torque which may result from acceleration, deceleration, transmission shifts, switching accessories (like air conditioning) on or off, pulling a trailer, climbing a hill, and so on.

A demand for torque generates a requirement to increase the quantity of fuel provided to the engine in order to raise the level of energy released by combustion. This requires a concurrent provision of additional air to burn the additional fuel. A uniflow-scavenged, OP2S engine equipped with electronically-controlled air and fuel handling systems may produce smoke, or produce other hydrocarbon emissions, or experience misfiring in response to a torque demand if the response time of the air handling system lags that of the fuel handling system. For example, in diesel applications of an OP2S engine, without timely provision of additional air in response to a torque demand the increased level of diesel fuel may be incompletely burned, which can result in the transport of particulate matter comprising unburned fuel droplets, incompletely burned fuel, and soot in the exhaust stream, thereby creating smoke.

Therefore, it is desirable to limit the consequences of incomplete combustion due to air handling lag in response to a torque demand during operation of a uniflow-scavenged, OP2S engine. Consequently, during a torque demand, a limiting factor for the engine's operation may be defined by the delay in providing sufficient air to burn the additional fuel provided in response to the demand.

Provision of fuel and air in the engine are governed by an engine control mechanization that senses various engine operating parameters and regulates the flow of gasses (air and exhaust) through the engine and the injection of fuel into the engine. It is particularly desirable that the engine control mechanization be able to limit the additional fuel quantity provided in response to a torque demand while the air handling system increases the airflow to a level sufficient to support full combustion at the requested torque level.

SUMMARY

In a uniflow-scavenged, OP2S engine equipped with a fuel handling system and an air handling system, a torque demand initiates limitation of the fuel quantity provided in response to sensing, measurement, or estimation of one or more airflow parameter levels. A minimum allowable airflow parameter level is provided as a function of the torque demand and candidate quantities of fuel are determined based on the minimum allowable airflow parameter level and a sensed airflow level. A limited fuel quantity is determined based upon a comparison and a selection from among the candidate quantities of fuel.

In some aspects, wherein fuel provision and airflow are governed by an engine control mechanization, the selected limited fuel quantity may be provided as one of a limited fuel command and a limited torque command, depending upon a governing mode of engine control.

In some other aspects, the one or more minimum allowable airflow parameters comprise one of a global airflow parameter based on total airflow through the engine and a corresponding trapped airflow parameter based on charge air trapped in a cylinder by the last port of the cylinder to close.

In yet other aspects, the one or more minimum allowable airflow parameters comprise both of a global airflow parameter based on total airflow through the engine and a corresponding trapped airflow parameter based on charge air trapped in a cylinder by the last port of the cylinder to close.

In particular, these aspects may include a global air/fuel ratio and a trapped air/fuel ratio.

BRIEF DESCRIPTION OF THE DRAWINGS

FIG. 7 is a data table representing an airflow map.

DETAILED DESCRIPTION OF THE PREFERRED EMBODIMENTS

Figure 1:
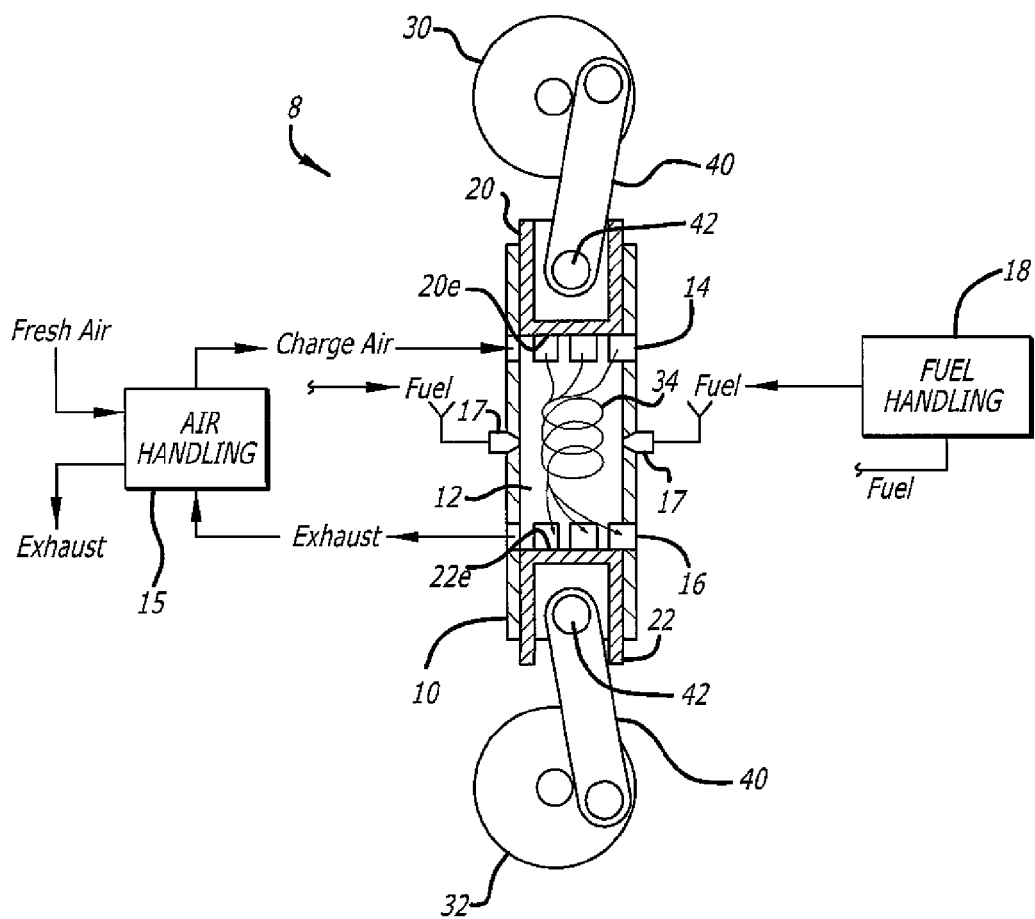
FIG. 1 is a schematic illustration of a uniflow-scavenged, two-stroke cycle, opposed-piston (OP2S) engine of the prior art.

FIG. 1 is a schematic representation of a uniflow-scavenged, two-stroke cycle opposed-piston (OP2S) engine 8 of the compression ignition type that includes at least one cylinder. Preferably, the engine 8 has two or more cylinders. In any event, the cylinder 10 represents both single cylinder and multi-cylinder configurations of the OP2S engine 8. The cylinder 10 includes a bore 12 and longitudinally displaced intake and exhaust ports 14 and 16 machined or formed in the cylinder, near respective ends thereof. An air handling system 15 of the engine 8 manages the transport of charge air into, and exhaust out of, the engine. Each of the intake and exhaust ports includes one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions in FIG. 1. Fuel injectors 17 include nozzles that are secured in threaded holes that open through the sidewall of the cylinder for direct side injection into the cylinder. Two pistons 20, 22 are disposed in the bore 12 with their end surfaces 20e, 22e in opposition to each other. For convenience, the piston 20 is referred to as the "intake" piston because it opens and closes the intake port 14. Similarly, the piston 22 is referred to as the "exhaust" piston because it opens and closes the exhaust port 16. Preferably, but not necessarily, the intake piston 20 and all other intake pistons are coupled to a crankshaft 30 disposed along one side of the engine 8; and, the exhaust piston 22 and all other exhaust pistons are coupled to a crankshaft 32 disposed along the opposite side of the engine 8.

Operation of the OP2S engine 8 is well understood. In response to combustion the opposed pistons move away from respective TDC locations where they are at their innermost positions in the cylinder 10. While moving from TDC, the pistons keep their associated ports closed until they approach respective BDC locations where they are at their outermost positions in the cylinder and the associated ports are open. The pistons may move in phase so that the intake and exhaust ports 14, 16 open and close in unison. Alternatively, one piston may lead the other in phase, in which case the intake and exhaust ports have different opening and closing times.

As charge air enters the cylinder 10 through the intake port 14, the shapes of the intake port openings cause the charge air to rotate in a vortex 34 about the cylinder's longitudinal axis, which spirals in the direction of the exhaust port 16. A swirl vortex 34 promotes air/fuel mixing, combustion, and suppression of pollutants. Swirl velocity increases as the end surfaces 20e and 22e move together.

Figure 2:
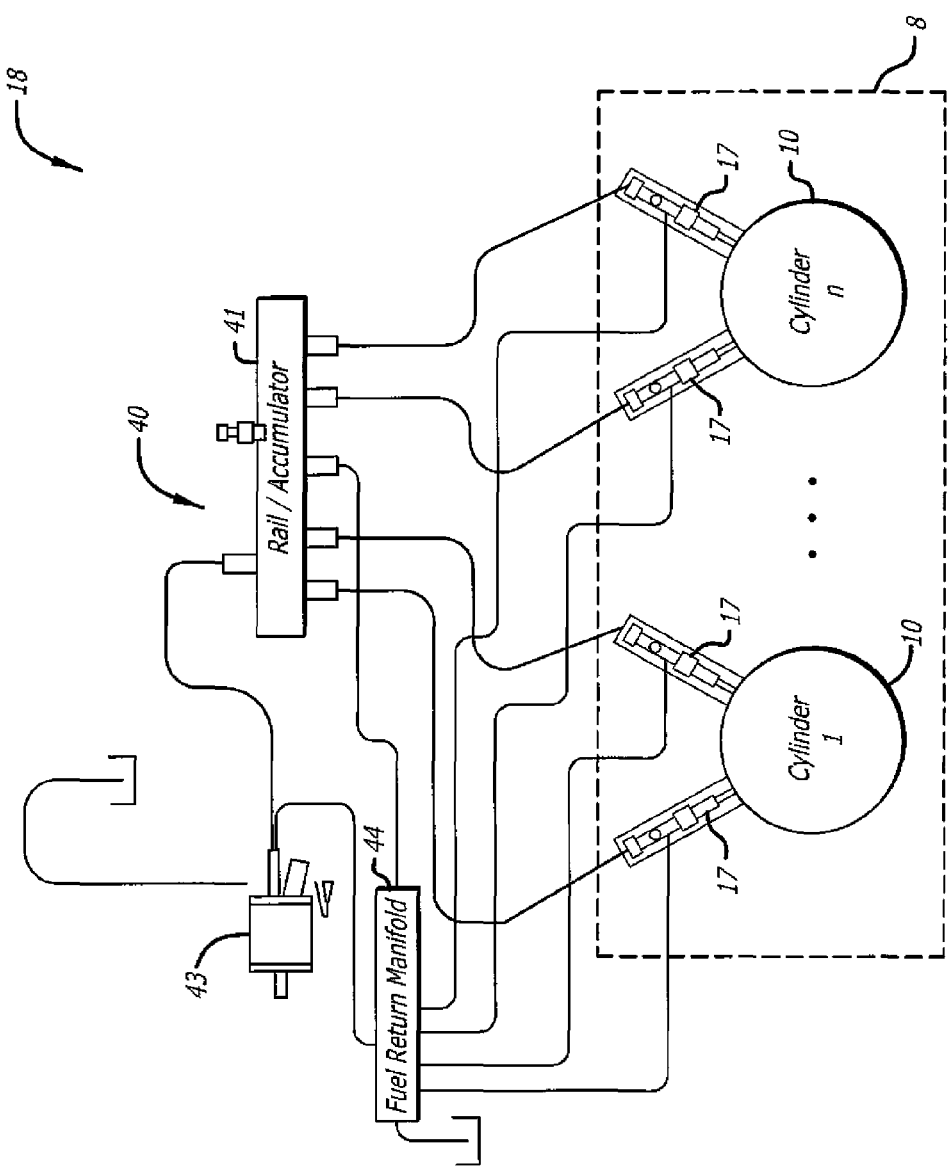
FIG. 2 is a schematic diagram illustrating a fuel injection system embodiment for an OP2S engine.

FIG. 2 shows an embodiment of a fuel handling system for an OP2S engine. Preferably, the fuel handling system is embodied as a common rail direct injection fuel handling system. The fuel handling system 18 delivers fuel to each cylinder 10 by injection into the cylinder. Preferably, each cylinder 10 is provided with multiple fuel injectors mounted for direct injection into cylinder space between the TDC locations of piston end surfaces. For example, each cylinder 10 has two fuel injectors 17. Preferably, fuel is fed to the fuel injectors 17 from a fuel source 40 that includes at least one rail/accumulator mechanism 41 to which fuel is pumped by a fuel pump 43. A fuel return manifold 44 collects fuel from the fuel injectors 17 and the fuel source 40 for return to a reservoir from which the fuel is pumped. Elements of the fuel source 40 are operated by respective computer-controlled actuators that respond to fuel commands issued by an engine control unit. Although FIG. 2 shows the fuel injectors 17 of each cylinder disposed at an angle of less than 180°, this is merely a schematic representation and is not intended to be limiting with respect to the locations of the injectors or the directions of the sprays that they inject. In a preferred configuration, best seen in FIG. 1, the injectors 17 are disposed for injecting fuel sprays in diametrically opposing directions of the cylinder 10 along an injection axis. Preferably, each fuel injector 17 is operated by a respective computer-controlled actuator that responds to injector commands issued by an engine control unit.

Figure 3:
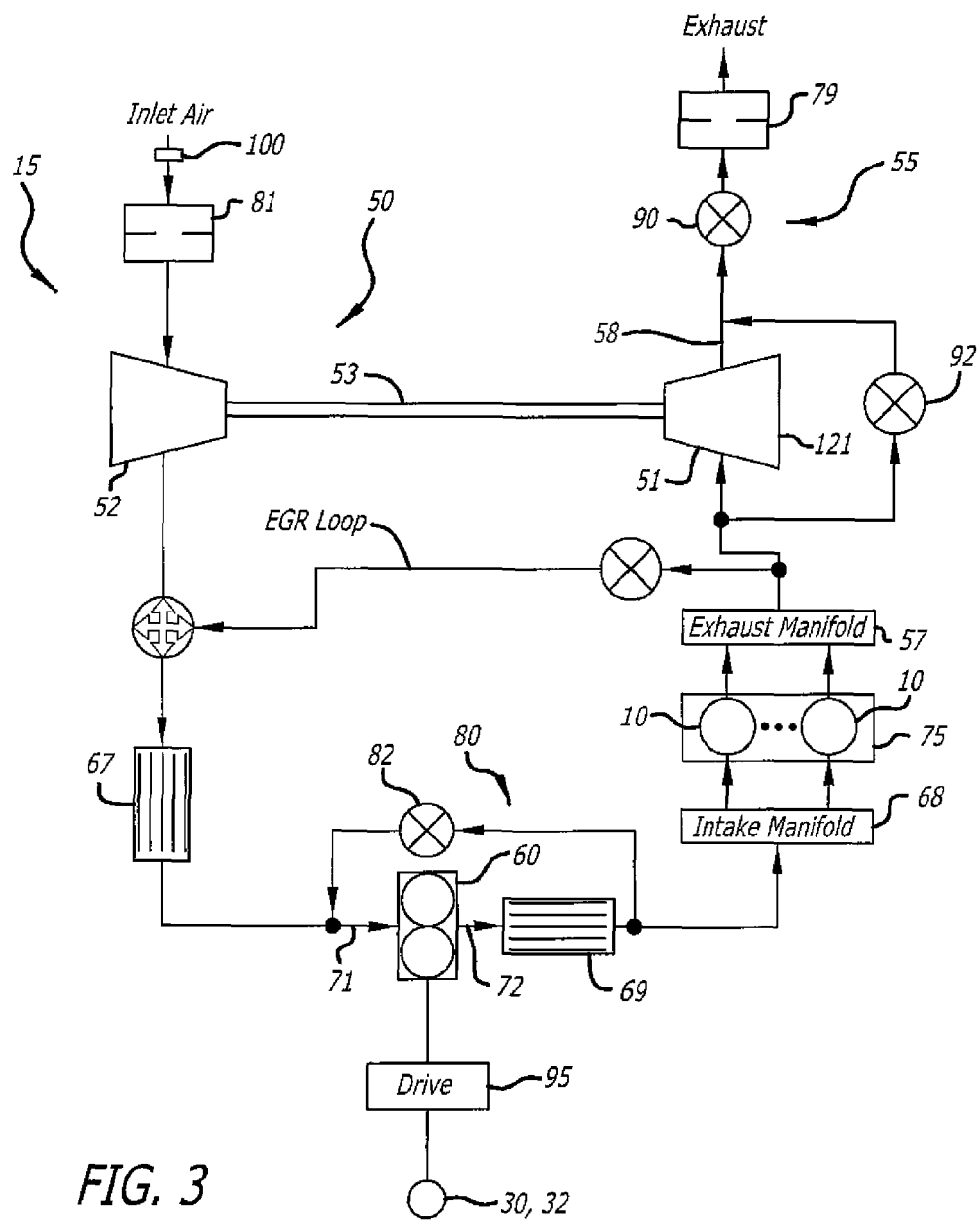
FIG. 3 is a schematic diagram illustrating an air handling system embodiment for an OP2S engine.

FIG. 3 shows an embodiment of an air handling system that manages the transport of charge air provided to, and exhaust gas produced by, a uniflow-scavenged OP2S engine. A representative air handling system construction includes a charge air subsystem and an exhaust subsystem. In the air handling system 15, a charge air source receives fresh air and processes it into charge air. The charge air subsystem receives the charge air and transports it to the intake ports of the engine 8. The exhaust subsystem transports exhaust products from exhaust ports of the engine for delivery to other exhaust components.

The air handling system 15 includes a turbocharger system comprising one or more turbochargers. For example, a turbocharger 50 includes a turbine 51 and a compressor 52 that rotate on a common shaft 53. The turbine 51 is coupled to the exhaust subsystem and the compressor 52 is coupled to the charge air subsystem. The turbocharger 50 extracts energy from exhaust gas that exits the exhaust ports and flows into an exhaust channel 55 directly from engine exhaust ports 16, or from an exhaust manifold assembly 57 that collects exhaust gasses output through the exhaust ports. Preferably, in a multi-cylinder OP2S engine, the exhaust manifold 57 comprises an exhaust plenum or chest that communicates with the exhaust ports 16 of all cylinders 10, which are supported in a cylinder block. The turbine 51 is rotated by exhaust gas passing through it to an exhaust outlet 58. This rotates the compressor 52, causing it to generate charge air by compressing fresh air.

Exhaust gasses from the exhaust ports of the cylinders 10 flow from the exhaust manifold assembly 57 into the inlet of the turbine 51, and from the turbine's outlet into the exhaust outlet channel 55. In some instances, one or more aftertreatment devices 79 are provided in the exhaust outlet channel 55. While the air handling system 15 may be constructed to reduce NOx emissions produced by combustion by recirculating exhaust gas through the ported cylinders of the engine, the details of an exhaust gas recirculation loop are not necessary to an understanding of fuel limitation according to this disclosure.

The charge air subsystem may provide inlet air to the compressor 52 via an air filter 81. As the compressor 52 rotates it compresses inlet air, and the compressed inlet air flows into the inlet 71 of a supercharger 60. Air pumped by the supercharger 60 flows through the supercharger's outlet 72 into the intake manifold 68. Pressurized charge air is delivered from the intake manifold 68 to the intake ports 14 of the cylinders 10. Preferably, in a multi-cylinder OP2S engine, the intake manifold 68 comprises an intake plenum or chest that communicates with the intake ports 14 of all cylinders 10.

The charge air subsystem may further include at least one cooler coupled to receive and cool charge air before delivery to the intake ports of the engine 8. In these instances, charge air output by the compressor 52 flows through a cooler 67, whence it is pumped by the supercharger 60 to the intake ports. A second cooler 69 may be provided between the output of the supercharger 60 and the intake manifold 62.

With further reference to FIG. 3, the air handling system 15 is equipped for control of gas flow at separate control points in the charge air and exhaust subsystems. In the charge air subsystem, charge air flow and boost pressure are controlled by operation of a shunt path 80 coupling the output 72 of the supercharger to the supercharger's input 71. The shunt path 80 includes a shunt valve 82 that governs the flow of charge air into, and thus the pressure in, the intake manifold 62. More precisely, the shunt valve 82 shunts the charge air flow from the supercharger's outlet 72 (high pressure) to its inlet 71 (lower pressure). A backpressure valve 90 in the exhaust channel 55 governs the flow of exhaust out of, and thus the backpressure in, the exhaust subsystem. As per FIG. 3, the backpressure valve 90 is positioned in the exhaust channel 55, between the output 58 of the turbine 51 and the after-treatment devices 79. A wastegate valve 92 diverts exhaust gasses around the turbine, which enables control of the speed of the turbine. Regulation of the turbine speed enables regulation of the compressor speed which, in turn, permits control of charge air boost pressure. These valves 90 and 92 are opened and closed by respective computer-controlled actuators that respond to rotational commands issued by an engine control unit.

In some instances, additional control of gas flow and pressure is provided by way of a variable speed supercharger. In these aspects, the supercharger 60 is mechanically coupled by a drive mechanism 95 (Drive) to a crankshaft 30 or 32 of the engine 8, to be driven thereby. The drive mechanism 95 may comprise a stepwise transmission device, or continuously variable transmission device (CVD), in which cases charge air flow, and boost pressure, may be varied by varying the speed of the supercharger 60 in response to a speed control signal provided to the drive mechanism 95. In other instances, the supercharger may be a single-speed device with a mechanism to disengage the drive, thus giving two different drive states. The drive mechanism 95 is operated by a computer-controlled actuator that responds to drive commands.

In some aspects, the turbine 51 may be a variable-geometry turbine (VGT) device having an effective aspect ratio that may be varied in response to changing speeds and loads of the engine. Alteration of the aspect ratio enables control of the speed of the turbine. Regulation of the turbine speed enables regulation of the compressor speed which, in turn, permits control of charge air boost pressure. Thus, in many cases, a turbocharger comprising a VGT does not require a wastegate valve. A VGT device is operated by a computer-controlled actuator that responds to turbine commands issued by an engine control unit.

In some instances, the air handling system may include an EGR loop to control undesirable emissions. The EGR loop may comprise a high pressure configuration, as shown in FIG. 3. Alternatively, it may comprise a low pressure configuration or a medium pressure configuration.

In this disclosure, art engine control mechanization is a computer-based system that governs the operations of various engine systems, including the fuel handling system, the air handling system, a cooling system, a lubrication system, and other engine systems. The engine control mechanism includes one or more electronic control units coupled to associated sensors, actuators, and other machine devices throughout the engine. As per FIG. 4, control of the fuel handling system of FIG. 2 and the air handling system of FIG. 3 (and, possibly, other systems of a uniflow-scavenged, OP2S engine) is implemented by a control mechanization 93 that includes an ECU (engine control unit) 94 programmed to execute fuel handling algorithms and air handling algorithms under various engine operating conditions. For a common rail direct injection system, the ECU 94 controls injection of fuel into the cylinders by issuing Fuel commands for provision of fuel by the fuel source 40 to the injectors 17, and by issuing Injector commands for operation of the injectors 17. For the air handling system the ECU 94 controls the transport of gas (charge air and exhaust) through the engine by issuing Backpressure, Wastegate and Shunt commands to open and close the exhaust backpressure valve 90, the wastegate valve 92, and the supercharger shunt valve 82, respectively, and also by issuing Drive commands to actuate the supercharger drive 95 and VGT commands to open/close the aspect ratio of the turbine 51 (if configured as a VGT).

When the OP2S engine 8 runs, the ECU 94 determines the current engine operating state based on engine load and engine speed, and governs the amount, pattern, and timing of fuel injected into each cylinder 10 by control of common rail fuel pressure and injection duration, based on the current operating state. For this purpose, the ECU 94 receives a Desired Load signal from an accelerator sensor 96 (or a speed governor or a cruise control system, or equivalent means) that detects accelerator position, an engine speed sensor 97 that detects the rotational speed (RPM) of the engine, and a fuel supply sensor 98 that detects a quantity of fuel being provided to the engine. At the same time, the ECU 94 configures the air handling system 15 to provide the optimal AFR for the current operational state. For this purpose, the ECU receives signals from a mass air flow sensor 100 that detects the mass flow of air into the inlet of the compressor 52, an intake manifold pressure sensor 101 that detects charge air pressure in the intake manifold 68, an exhaust manifold pressure sensor 102 that detects exhaust pressure in the exhaust manifold 57, a supercharger intake pressure sensor 103 that detects charge air pressure at the intake of the supercharger 60, a supercharger outlet pressure sensor 104 that detects charge air pressure at the outlet of the supercharger 60, and, possibly other sensors.

Fuel Limitation:

During transient engine operations occurring when a torque demand is being accepted, a limiting factor for the engine response is defined by how quickly the air handling system can transition the airflow through the engine while keeping the emissions under control. The air handling system generally lags behind the fuel handling system in meeting a desired operational setpoint for the torque demand, and so it becomes desirable to limit the quantity of fuel being injected while the slower-responding air handling system catches up with the faster fuel handling system. Further, it becomes useful to relate the limitation in fuel quantity to an airflow parameter that indicates the response of the air handling system so as to ensure a smooth transition of air and fuel to desired setpoints. Such airflow parameters include mass airflow, lambda, EGR flow, intake manifold pressure, and others. One useful example of an airflow parameter that indicates the response of the air handling system is air/fuel ratio.

An air/fuel ratio (AFR) is a ratio of the mass of air to the mass of fuel in a mixture of air and fuel consumed by a combustion event in a cylinder. When the AFR is stoichiometric, the fuel and air are fully consumed by combustion, that is to say all of the fuel is burned and no air remains. When there is insufficient air to fully combust the fuel (or too much fuel to be burned by the mass of air available) the mixture is rich and AFR is lower than stoichiometric. In the exemplary case of a uniflow-scavenged OP2S engine operated in a diesel mode, a rich mixture can result in particulate matter (including smoke or soot) being expelled in the exhaust. Too much air (or too little fuel) produces a high AFR as compared to the stoichiometric ratio; the mixture is lean, and the excess air combines with nitrogen in the presence of the heat of combustion to produce NOx elements in the exhaust.

When the air-handling system lags behind the fuel-handling system in meeting the torque demand, one result is a reduction of AFR for a short period of time during which the fuel and air handling systems respond to (accept) the demand. Reduction of AFR may produce undesirable effects in emissions (smoke, hydrocarbons) or in engine operation (misfires). For example, in diesel operation, the reduction of AFR can cause a significant spike in soot emissions. Accordingly, it is desirable to implement a fuel quantity limitation capability for a uniflow-scavenged OP2S engine in order to achieve and maintain desired AFR values.

In a uniflow-scavenged OP2S engine, some of the mass of air delivered to a cylinder during a cycle of engine operation ("delivered air") flows out of the exhaust port during scavenging and thus is not available for combustion. Hence, a desirable measure of AFR for controlling combustion uses the mass of charge air retained ("trapped") in the cylinder when the last port of the cylinder is closed. Depending on engine design, either the exhaust port or the intake port may be the last to close; however, in most instances, the intake port is the last to close. It is further the case that, in addition to the trapped charge air, a measurable mass of residual exhaust gas may sometimes be trapped in the cylinder by closure of the exhaust port and/or by recirculation into the cylinder with the charge air. In this case, the total mass of trapped gas (charge air and exhaust) is referred to as "trapped charge."

The uniflow-scavenging process of an OP2S engine is defined by two attributes: scavenge ratio and scavenging efficiency. Depending upon the scavenge ratio and scavenging efficiency, the amount of trapped charge air and delivered air can be significantly different. Both these attributes impact the trapped conditions in a cylinder of an OP2S engine. Accordingly it is desirable in some instances to utilize either or both of a global AFR and a trapped AFR to initialize fuel quantity limitation in an OP2S engine.

Global AFR is determined with reference to the total mass of charge air delivered to a cylinder during one cycle of engine operation. Delivered charge air mass may be measured using a mass airflow (MAF) sensor 100 (FIGS. 3 and 4) at the inlet to compressor, or, possibly, a $NOx/O_2$ sensor at the exhaust outlet channel 55. Alternatively, delivered charge air mass may be obtained from a digital model. On the other hand, trapped AFR is determined with reference to the total mass of charge trapped (retained) in a cylinder by the last port of the cylinder to close during one cycle of engine operation. Trapped charge (trapped charge air mass plus the mass of any trapped exhaust) can be measured by a virtual sensor, or estimated in real time on the basis of trapped conditions in the cylinder. See, for example, the procedures for determining trapped lambda and trapped burn fraction that are disclosed in commonly-owned U.S. Pat. No. 9,206,751; US 2014/0373815; and US 2014/0373816.

Figure 5:
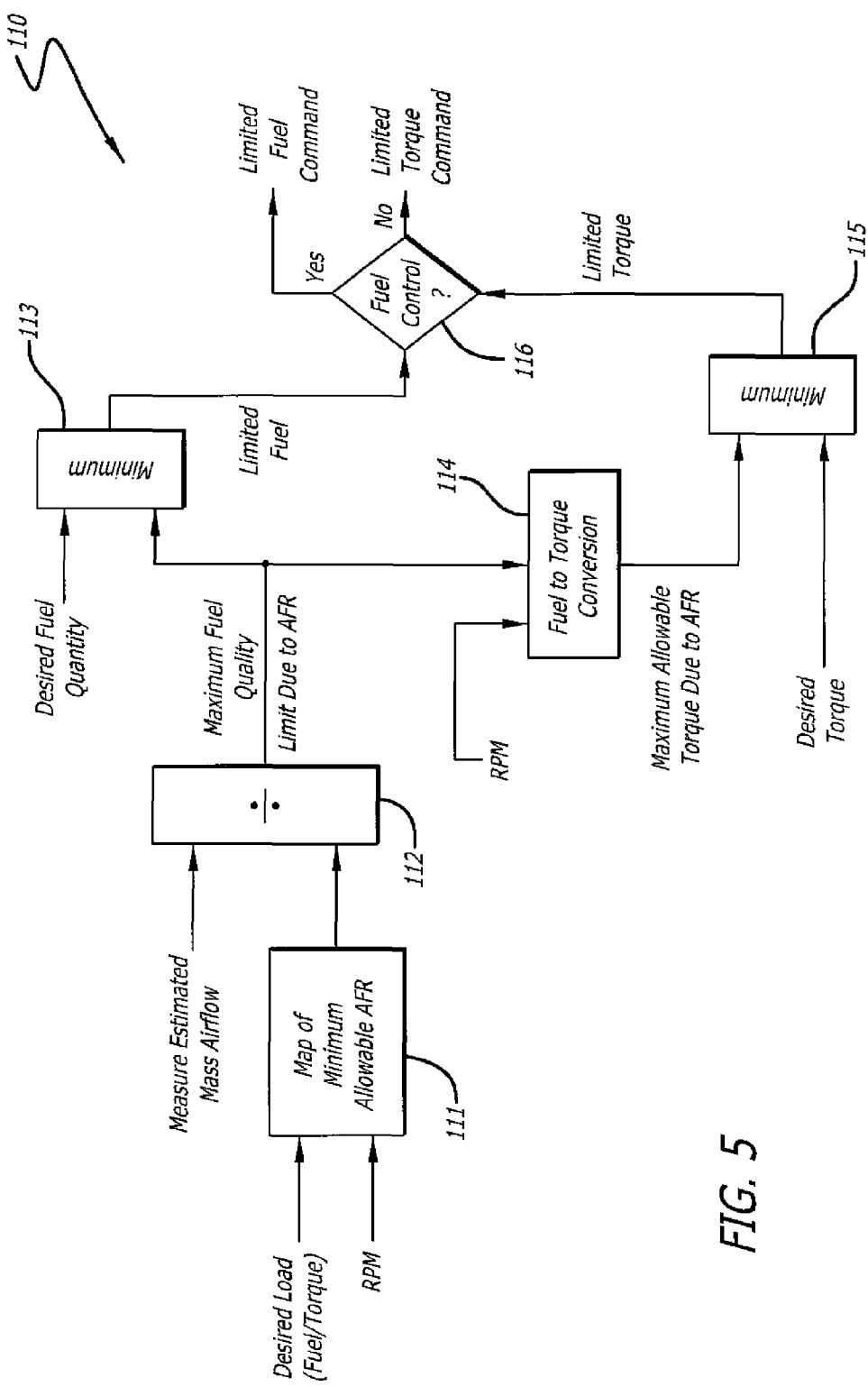
FIG. 5 is a schematic diagram illustrating a process embodiment for limiting an increase in an amount of torque or fuel provided to an OP2S engine in response to a torque demand.

With reference to FIG. 5, the ECU 94 may execute a fuel limiter algorithm 110 that references one or more airflow parameters in order to limit fuel quantity during transition of fuel and air handling systems in response to a torque demand. In this specification a torque demand is embodied by some indication of a desired engine load, such as a current accelerator position. Further, depending on a preferred mode of fuel control, a current accelerator position may be converted by known means to a desired fuel quantity level or a desired torque level.

In performing control algorithms for a uniflow-scavenged, OP2S engine, including the fuel limiter algorithm 110, the ECU 94 makes use of calibration tables which contain calibration data representative of optimal engine performance that is obtained from test engines operating in dynamometers. The calibration tables (also called "maps") are used by the ECU 94 to model the engine in terms of performance, emissions, and fuel economy. The ECU 94 determines the quantity of fuel required to achieve the desired torque and the amount of charge air necessary to yield a desired AFR based on calculations using computer models and calibration data stored in maps. Using the calibration data, engine speed, mass airflow, and the required engine load, and, possibly, other engine operating parameters, the ECU 94 calculates the quantity of fuel to be provided.

In performing the fuel limiter algorithm, the ECU 94 utilizes maps that covert engine operating parameter values to airflow parameter values, maps that convert torque load demands to desired fuel quantities and desired torque quantities, maps that convert desired fuel quantities to desired torque quantities, maps that convert desired torque quantities to desired fuel quantities, and various other maps. Further, the ECU 94 is enabled to control fuel provision according to various methods, including a torque control method and a fuel control method. In this regard, a torque control method of fuel provision relates engine speed to an allowable fuel quantity in view of engine horsepower and torque limits. A fuel control method relates engine speed to an allowable fuel quantity in view of a desired acceleration.

Figure 4:
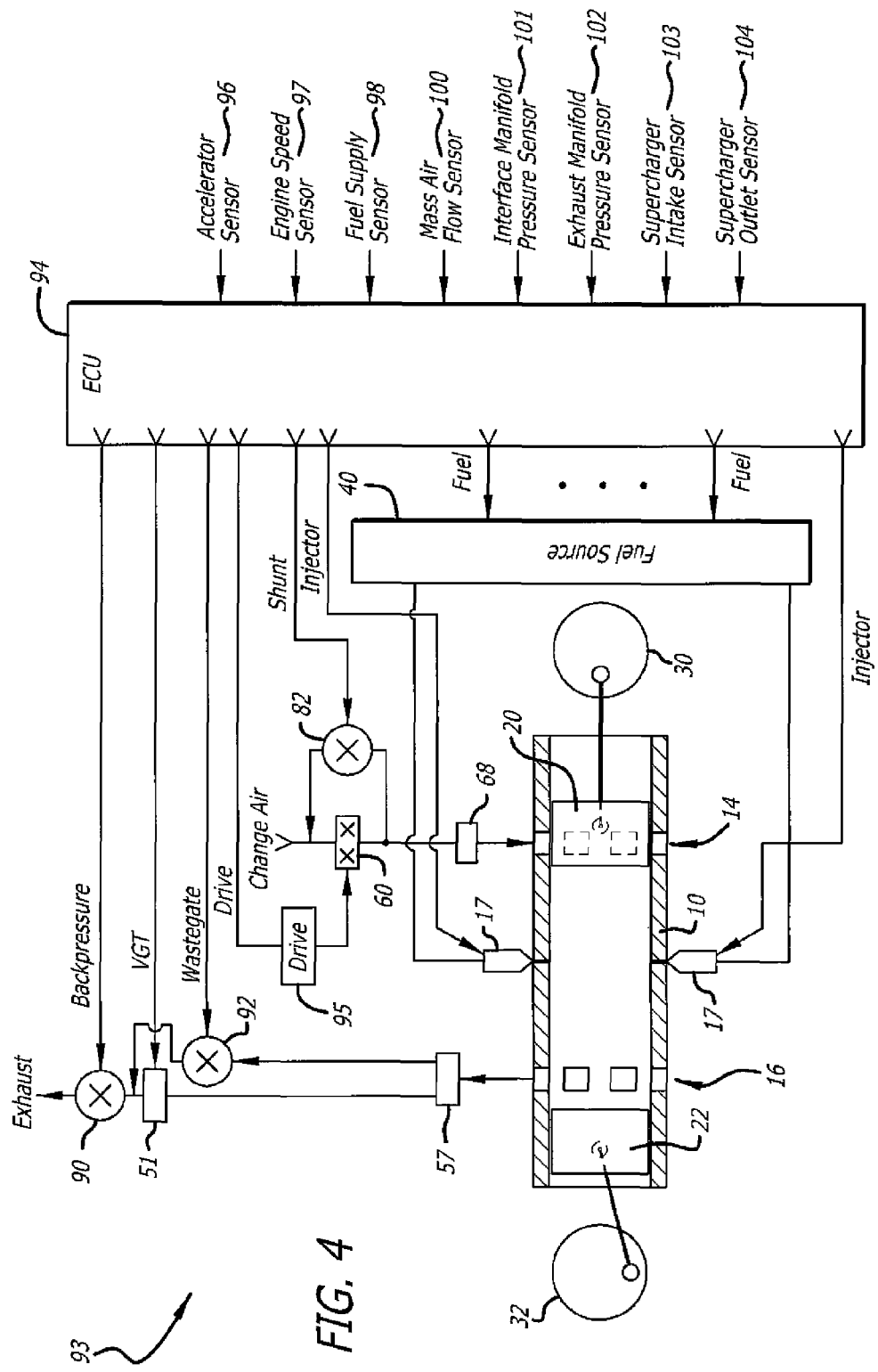
FIG. 4 is a schematic diagram illustrating a control mechanization embodiment for controlling provision of fuel and airflow in an OP2S engine.

Referring to FIG. 5, the ECU 94 executes the fuel limiter algorithm 110 using an airflow parameter map 111, which may be embodied as a look-up table accessed by an engine speed signal (RPM) indicating a current engine speed and a desired engine load signal (Desired Load), which may comprise, for example, an accelerator position signal. The map 111 outputs a minimum allowable value of the airflow parameter for the current engine speed and accelerator position values. For example, the map 111 outputs a minimum value of AFR for the current values of RPM and Desired Load. A maximum fuel quantity limit due to the minimum allowable value of AFR is derived at 112 by division of the measured airflow value by the minimum allowable airflow value. For example, the divider 112 outputs a maximum fuel quantity limit due to a minimum AFR value obtained from the map 111 and a value of mass airflow obtained by a sensor (physical or virtual), or by estimation or calculation. Presuming that the ECU 94 is governing fuel provision according to a fuel control method, the maximum fuel quantity limit is compared at 113 with a desired fuel quantity derived from the Desired Load signal, and the minimum of the maximum and desired fuel quantities is output from the comparator 113 as a Limited Fuel signal indicative of a limited quantity of fuel to be injected. In most instances, the Limited Fuel signal is output by the ECU 94 as a Limited Fuel command to the fuel source 40 (FIGS. 2 and 4).

Presuming that the ECU 94 is governing fuel provision according to a torque control method, the maximum fuel quantity limit produced at 112 is converted at 114 to a maximum allowable torque at the current RPM, and the maximum allowable torque is compared with a desired torque quantity derived from the Desired Load signal at 115. The minimum of the maximum and desired torque quantities is output from the comparator 115 as a Limited Torque signal indicative of a limited quantity of fuel to be injected in order not to exceed a torque limit. In most instances, the Limited Torque signal is output by the ECU 94 as a Limited Torque Fuel command to the fuel source 40 (FIGS. 2 and 4).

The fuel limiter algorithm 110 may be constructed and programmed for either a fuel control method comprising the map 111, the divider 112, and the comparator 113, or a torque control method, comprising the map 111, the divider 112, the conversion 114, and the comparator 115. In some instances, as suggested by FIG. 5, the ECU 94 may be constructed and programmed for both a fuel control method and a torque control method, in which case, the fuel limiter algorithm further comprises a control selector 116 programmed to output a Limited Fuel command if the ECU 94 is implementing fuel control method, or a Limited Torque Fuel command if the ECU 94 is implementing a torque control method.

Further, the fuel limiter algorithm 110 may be constructed for fuel quantity limitation controlled by global AFR or for fuel quantity limitation controlled by trapped AFR. In the first instance, the map 111 would contain minimum allowable global AFR values, which would be combined with delivered air mass values in the divider 112. In the second instance, the map 111 would contain minimum allowable trapped AFR values, which would be combined with trapped charge mass values in the divider 112.

Figure 6:
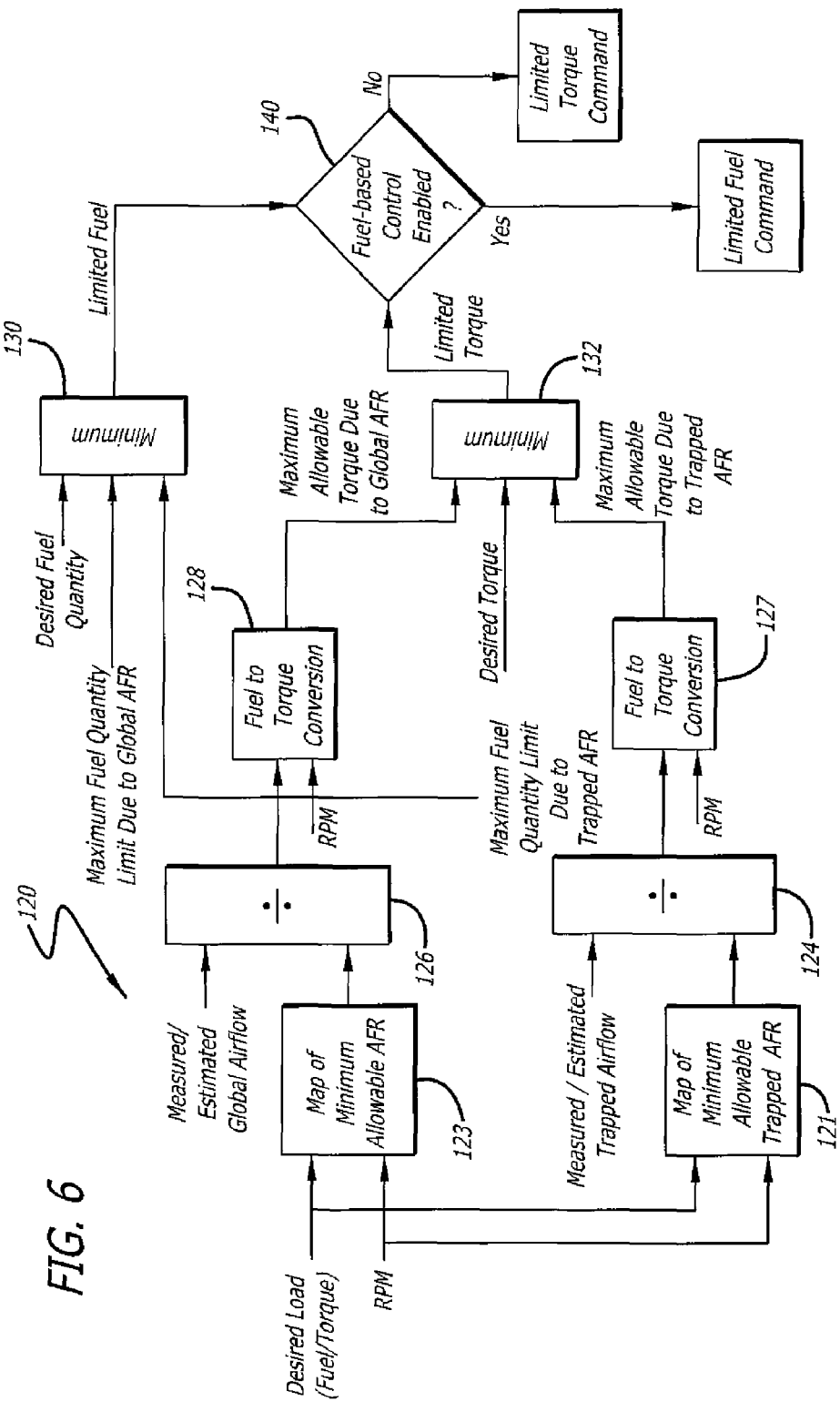
FIG. 6 is a schematic diagram illustrating a process embodiment for limiting an increase in an amount of torque or fuel provided to an OP2S engine in response to a torque demand.

With reference to FIG. 6, the ECU 94 may execute a fuel limiter algorithm 120 that references global and trapped airflow parameters in order to limit fuel quantity during transition of fuel and air handling systems in response to a torque demand. In this specification a torque demand is embodied by some indication of a desired engine load, such as a current accelerator position. Further, depending on a preferred mode of fuel control, a current accelerator position may be converted by known means to a desired fuel quantity level and/or a desired torque level. The ECU 94 executes the fuel limiter algorithm 120 using a trapped airflow parameter map 121 and a global airflow parameter map 123. The map 121 outputs a minimum allowable value of the trapped AFR parameter for the current engine speed and desired load values. The map 123 outputs a minimum allowable value of the global AFR parameter for the current engine speed and desired load values.

A maximum fuel quantity limit due to the minimum allowable value of the trapped AFR is derived at 124 by division of the measured trapped AFR value by the minimum allowable trapped AFR value. For example, the divider 124 outputs a maximum fuel quantity limit due to a minimum trapped AFR value obtained from the map 121 and a value of trapped mass airflow obtained by a sensor (physical or virtual), or by estimation or calculation. A maximum fuel quantity limit due to the minimum allowable value of the global AFR is derived at 126 by division of the measured global AFR value by the minimum allowable global AFR value. For example, the divider 126 outputs a maximum fuel quantity limit due to a minimum global AFR value obtained from the map 123 and a value of global mass airflow obtained by a sensor (physical or virtual), or by estimation or calculation.

Presuming that the ECU 94 is governing fuel provision according to a fuel control method, the maximum fuel quantity limit due to trapped AFR, the maximum fuel quantity limit due to global AFR, a desired fuel quantity derived from the Desired Load signal are compared at 130, and the minimum of the three values is output from the comparator 130 as a Limited Fuel signal indicative of a limited quantity of fuel to be injected.

A maximum allowable torque quantity limit due to the minimum allowable value of the trapped AFR is derived at 127 by conversion of a maximum fuel quantity limit due to the minimum allowable value of the trapped AFR output by the divider 124, based upon current RPM. Similarly, a maximum allowable torque quantity limit due to the minimum allowable value of the global AFR is derived at 128 by conversion of a maximum fuel quantity limit due to the minimum allowable value of the global AFR output by the divider 126, based upon current RPM.

Presuming that the ECU 94 is governing fuel provision according to a torque control method, the maximum torque quantity limit due to trapped AFR, the maximum torque quantity limit due to global AFR, a desired torque quantity derived from the Desired Load signal are compared at 132, and the minimum of the three values is output from the comparator 132 as a Limited Torque signal indicative of a limited quantity of fuel to be injected.

With references to FIGS. 4 and 5, in most instances, the Limited Fuel signal is output by the ECU 94 as a Limited Fuel command to the fuel source 40 (FIGS. 2 and 4). Presuming that the ECU 94 is governing fuel provision according to a torque control method, the maximum fuel quantity limit is converted at 114 with a desired torque quantity derived from the Desired Load signal, and the minimum of the maximum and desired torque quantities is output from the comparator 115 as a Limited Torque signal indicative of a limited quantity of fuel to be injected in order not to exceed a torque limit. In most instances, the Limited Torque signal is output by the ECU 94 as a Limited Torque Fuel command to the fuel source 40 (FIGS. 2 and 4).

With references to FIGS. 4 and 6, the fuel limiter algorithm 120 may be constructed and programmed for either a fuel control method comprising the maps 121 and 123, the dividers 124 and 126, and the comparator 130, or a torque control method, comprising the maps 121 and 123, the dividers 124 and 126, the convertors 127 and 128, and the comparator 132. In some instances, as suggested by FIG. 6, the ECU 94 may be constructed and programmed for both a fuel control method and a torque control method, in which case, the fuel limiter algorithm further comprises a control selector 140 programmed to output a Limited Fuel command if the ECU 94 is implementing fuel control method, or a Limited Torque Fuel command if the ECU 94 is implementing a torque control method.

The maps 111, 121, and 123, and other maps used by the ECU 94 (such as fuel maps and torque maps), are multidimensional arrays that output data from locations indexed by table inputs. A representative AFR map is illustrated in FIG. 7. The AFR map is indexed by inputs including engine speed (RPM) and a load command indicating a desired load; such a load command may comprise, for example an accelerator position For FIG. 5, maps of minimum allowable global or trapped AFRs are generated during calibration on the basis of engine speed and engine load. For FIG. 6, look-up-tables of minimum allowable global and trapped AFRs are generated during calibration on the basis of engine speed and engine load. The ECU 94 then uses measured or estimated global airflow and trapped airflow values in conjunction with the maps to generate the maximum fuel quantity (or torque quantity) that should be allowed to maintain minimum global or trapped AFR values.

In diesel-powered applications of a uniflow-scavenged, OP2S engine, if global or trapped AFR goes below a threshold, incomplete combustion can result thereby generating smoke. A smoke-limiter process regulates fuel-flow rate into the engine in order to prevent a global or trapped AFR value from going below a certain threshold. A trade-off associated with calibrating a smoke-limiter process aggressively is that although it reduces soot emissions, it also causes slower torque response to driver's torque request.

Either of the fuel quantity limiter algorithms 110 and 120 may be appropriately programmed as smoke limiters. In this regard, a smoke limiter is a routine based on calibration air/fuel ratios that produce smoke from rich air/fuel mixtures. Thus, in response to torque demands, either algorithm will determine a maximum allowable quantity of diesel fuel that can be provided without exceeding a smoke-limited AFR-a known air/fuel ratio that limits production of smoke from rich conditions. This quantity is passed in a Fuel command to the fuel source 40. As a smoke limiter, either algorithm 110 and 120 will limit smoke produced by the OP2S engine during response to a torque demand when the airflow requirements in the engine are not immediately met due to transport delay, turbo lag, or possibly, other factors. Thus, if global or trapped AFR goes below a smoke threshold, it can result in incomplete combustion thereby generating smoke. The smoke-limiter process regulates fuel-flow rate into the engine in order to prevent global or trapped AFR value from going below a smoke threshold.

The contents of priority application U.S. Provisional Application Ser. No. 62/279,301 filed in the United States Patent and Trademark Office on 15 Jan. 2016, are hereby incorporated by reference.

Although control of fuel quantity in a uniflow-scavenged, two-stroke cycle, opposed-piston engine in response to a torque demand has been described with reference to presently preferred embodiments, it should be understood that various modifications can be made without departing from the scope of the following claims.

The invention claimed is:

1. A method for controlling operations of a uniflow-scavenged, two-stroke cycle, opposed-piston engine with a fuel source during demands for increased torque, comprising:
   receiving a torque demand for a desired torque level of the engine;
   determining a minimum value of a global air to fuel ratio (AFR) of the engine based on an engine speed and the desired torque level;
   determining a measured value of global mass airflow based on air flow conditions of the engine;
   determining a first maximum fuel quantity limit based on the minimum value of global AFR and the measured value of global mass airflow;
   determining a minimum value of a trapped AFR of the engine based on the engine speed and the desired torque level;
   determining a measured value of trapped mass airflow based on air flow conditions of the engine;
   determining a second maximum fuel quantity limit based on the minimum value of trapped AFR and the measured value of trapped mass airflow; and,
   limiting a quantity of fuel provided to the engine by:
      selecting the minimum of the first maximum fuel quantity limit, the second fuel quantity limit, and a desired fuel quantity derived from the torque demand, followed by providing a limited fuel command to the fuel source according to the selection; or,
      selecting the minimum of a torque based on the first maximum fuel quantity limit, a torque based on the second fuel quantity limit, and a desired torque derived from the torque demand, followed by providing a limited torque command to the fuel source according to the selection.

2. A method for limiting emissions of smoke by a uniflow-scavenged, two-stroke cycle, opposed-piston engine with a fuel source during demands for increased torque, comprising:
   receiving a torque demand for a desired torque level of the engine;
   determining a minimum value of a global smoke-limited air to fuel ratio (AFR) of the engine based on an engine speed and the desired torque level;
   determining a measured value of global mass airflow based on air flow conditions of the engine;
   determining a first maximum fuel quantity limit based on the minimum value of global smoke-limited AFR and the measured value of global mass airflow;
   determining a minimum value of a trapped smoke-limited AFR of the engine based on the engine speed and the desired torque level;
   determining a measured value of trapped mass airflow based on air flow conditions of the engine;
   determining a second maximum fuel quantity limit based on the minimum value of trapped smoke-limited AFR and the measured value of trapped mass airflow; and, limiting a quantity of fuel provided to the engine according to one of:
- selecting the minimum of the first maximum fuel quantity limit, the second fuel quantity limit, and a desired fuel quantity derived from the torque demand, followed by providing a limited fuel command to the fuel source according to the selection; and
- selecting the minimum of a torque based on the first maximum fuel quantity limit, a torque based on the second fuel quantity limit, and a desired torque derived from the torque demand, followed by providing a limited torque command to the fuel source according to the selection.

* * * * *

UNITED STATES PATENT AND TRADEMARK OFFICE
CERTIFICATE OF CORRECTION

PATENT NO. : 9,957,901 B2  
APPLICATION NO. : 15/062868  
DATED : May 1, 2018  
INVENTOR(S) : Nagar et al.

Page 1 of 1

It is certified that error appears in the above-identified patent and that said Letters Patent is hereby corrected as shown below:

In the Specification

-- Column 5, Line 43, delete "62" and replace with "68"

-- Column 5, Line 52, delete "62" and replace with "68"

In the Claims

-- Column 12, Claim 1, Line 36, delete "the second fuel quantity" and replace with "the second maximum fuel quantity"

-- Column 12, Claim 1, Line 42, delete "second fuel quantity" and replace with "second maximum fuel quantity"

-- Column 13, Claim 2, Line 4, delete "the second fuel quantity" and replace with "the second maximum fuel quantity"

-- Column 13, Claim 2, Line 11, delete "second fuel quantity" and replace with "second maximum fuel quantity"

Signed and Sealed this  
Sixth Day of November, 2018

Andrei Iancu  
*Director of the United States Patent and Trademark Office*